United States Patent
Zhang et al.

(10) Patent No.: US 10,499,284 B2
(45) Date of Patent: Dec. 3, 2019

(54) COMMUNICATION METHOD BASED ON UNLICENSED FREQUENCY BANDS, RELATED EQUIPMENT AND SYSTEM

(71) Applicant: YULONG COMPUTER TELECOMMUNICATION SCIENTIFIC (SHENZHEN) CO., LTD., Shenzhen (CN)

(72) Inventors: Zi-Jing Zhang, Shenzhen (CN); Xuan-Hang Wu, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/067,199

(22) PCT Filed: Sep. 28, 2016

(86) PCT No.: PCT/CN2016/100680
§ 371 (c)(1),
(2) Date: Jun. 29, 2018

(87) PCT Pub. No.: WO2017/113918
PCT Pub. Date: Jul. 6, 2017

(65) Prior Publication Data
US 2019/0028930 A1    Jan. 24, 2019

(30) Foreign Application Priority Data
Dec. 30, 2015 (CN) .......................... 2015 1 1022339

(51) Int. Cl.
*H04W 28/16* (2009.01)
*H04W 16/14* (2009.01)
(Continued)

(52) U.S. Cl.
CPC .......... *H04W 28/16* (2013.01); *H04W 16/14* (2013.01); *H04W 24/08* (2013.01); *H04W 72/0453* (2013.01); *H04W 84/12* (2013.01)

(58) Field of Classification Search
None
See application file for complete search history.

(56) References Cited

U.S. PATENT DOCUMENTS

2013/0201928 A1* 8/2013 Kim ...................... H04W 16/14
370/329
2014/0199994 A1    7/2014 Richards
(Continued)

FOREIGN PATENT DOCUMENTS

| | | |
|---|---|---|
| CN | 104333873 A | 2/2015 |
| CN | 105009621 A | 10/2015 |

(Continued)

*Primary Examiner* — Kodzovi Acolatse
(74) *Attorney, Agent, or Firm* — ScienBiziP, P.C.

(57) ABSTRACT

The present disclosure provides a communication method based on unlicensed frequency bands, a related equipment and a system, in which, the method includes: receiving a channel negotiation request, which includes a channel list that records information of a target unlicensed channel, the target unlicensed channel being a channel that needs to be used by the base station and in an unlicensed frequency band; responding to the channel negotiation request, and sending the channel list to an access point (AP) within a preset range, to instruct the AP to work through a channel included in the channel list except the target unlicensed channel; notifying the base station to communicate based on the target unlicensed channel, when a response message returned by the AP for the channel list is received. By utilizing embodiments of the present disclosure, efficiency of acquiring available channels in an unlicensed frequency band can be improved effectively.

15 Claims, 9 Drawing Sheets

(51) Int. Cl.
*H04W 24/08* (2009.01)
*H04W 72/04* (2009.01)
*H04W 84/12* (2009.01)

(56) References Cited

U.S. PATENT DOCUMENTS

| | | | | |
|---|---|---|---|---|
| 2015/0296516 A1* | 10/2015 | Jung | .................... | H04W 72/02 |
| | | | | 370/312 |
| 2015/0373729 A1* | 12/2015 | Lee | ..................... | H04W 8/245 |
| | | | | 370/329 |
| 2015/0382306 A1* | 12/2015 | Lee | .................... | H04W 52/243 |
| | | | | 455/501 |
| 2016/0007247 A1* | 1/2016 | Lee | .................. | H04W 36/0066 |
| | | | | 370/331 |
| 2016/0227416 A1* | 8/2016 | Suzuki | ............... | H04W 72/0453 |
| 2016/0227425 A1* | 8/2016 | Kim | ................... | H04L 5/0007 |
| 2016/0345345 A1* | 11/2016 | Malik | .................. | H04W 48/04 |
| 2016/0381645 A1* | 12/2016 | Shanks | ................ | H04W 24/10 |
| | | | | 370/338 |

FOREIGN PATENT DOCUMENTS

| | | | |
|---|---|---|---|
| CN | 105072690 | A | 11/2015 |
| CN | 105611542 | A | 5/2016 |
| EP | 3048845 | A1 | 7/2016 |
| EP | 3094124 | A1 | 11/2016 |
| WO | 2015058336 | A1 | 4/2015 |
| WO | 2015060760 | A1 | 4/2015 |
| WO | 2015113252 | A1 | 8/2015 |

\* cited by examiner

COMMUNICATION METHOD BASED ON UNLICENSED FREQUENCY BANDS, RELATED EQUIPMENT AND SYSTEM

CROSS-REFERENCE TO RELATED APPLICATIONS

This application claims priority of Chinese Patent Application No. 201511022339.2, entitled "communication method based on unlicensed frequency bands, related equipment and system," filed on Dec. 30, 2015 in the SIPO (State Intellectual Property Office of the People's Republic of China), the entire contents of which are incorporated by reference herein.

FIELD

The embodiments of the present disclosure relates to a technical field of communication, specifically a communication method based on unlicensed frequency band, a related equipment and a system.

BACKGROUND

At present, Long Term Evolution (Long Term Evolution) systems work in licensed frequency bands, as bandwidth resources of the licensed frequency bands are lack, thus, frequency bands need to be licensed to use, thereby usage cost of the licensed frequency bands is high. In order to reduce the cost, the LTE systems can be designed to work in unlicensed frequency bands, due to the fact that available bandwidth in the unlicensed frequency bands is large and can be used without license, for example, there is 580 Mhz available bandwidth in 5 Ghz frequency bands.

In actual communication, systems currently working in the unlicensed frequency bands include Wireless Local Area network (WLAN). When the LTE transmits data through the unlicensed frequency bands, and if the LTE systems use a channel of a frequency band, which the WLAN belongs to, in the unlicensed frequency band to transmit data, the WLAN system can also transmit data through the channel, this can result in channel interference. In order to solve a problem of the channel interference, and to realize coexistence of the LTE and the WLAN, a Listen Before Talk (LBT) mechanism is provided currently. The mechanism mainly includes that: the LTE monitors a channel in an unlicensed frequency band; when the channel is monitored to be busy, the unlicensed frequency band is not occupied; or when the channel is monitored to be idle, the channel is occupied. That is, in this situation that the channel is busy, the LTE system can only wait for the channel to be idle, or select another channel to monitor after a timeout. The mechanism for acquiring available channels in the unlicensed frequency bands is blind, a situation that a plurality of channels are continuously monitored to be busy may be occurred, thus, the efficiency of acquiring the available channels in the unlicensed frequency bands is low.

SUMMARY

The embodiments of the present disclosure provides a communication method based on unlicensed frequency bands, a related equipment and a system, these can effectively improve acquisition efficiency of available channels in the unlicensed frequency bands.

The embodiment of the present disclosure provides a communication method based on unlicensed frequency bands, the communication method includes:

Receiving a channel negotiation request, which includes a channel list that records information of a target unlicensed channel, the target unlicensed channel being a channel that needs to be used by the base station and in an unlicensed frequency band;

Responding to the channel negotiation request, and sending the channel list to an access point (AP) within a preset range, to instruct the AP to work through a channel except the target unlicensed channel included in the channel list;

Notifying the base station to communicate based on the target unlicensed channel, when a response message returned by the AP for the channel list is received.

Optionally, sending the channel list to the AP within the preset range including:

Sequentially sending a detection request frame carrying the channel list on a channel that is available used by a wireless local area network (WLAN), for notifying the AP within the preset range of the channel list through the detection request frame.

Optionally, there are a plurality of APs within the preset range, notifying the base station to communicate based on the target unlicensed channel including:

Detecting whether a response message returned by each of the plurality of APs within the preset range is received within a preset time window after sending the channel list;

Sending a channel negotiation response to the base station when the response message returned by each of the plurality of APs is received, for notifying the base station to communicate based on the target unlicensed channel.

Optionally, after notifying the base station to communicate based on the target unlicensed channel, the communication method further includes:

Forbidding scanning the target unlicensed channel.

Accordingly, the embodiment of the present disclosure discloses a communication method based on unlicensed frequency bands, the communication method includes:

Receiving a channel list including information of a target unlicensed channel sent by a user equipment, the target unlicensed channel being a channel that needs to be used by the base station and in an unlicensed frequency band;

Detecting whether a current used channel is the same as the target unlicensed channel;

Switching the current used channel to a channel that can be used by the WLAN except the target unlicensed channel, when the current used channel is the same as the target unlicensed channel;

Returning a response message to the user equipment when the current used channel is different from the target unlicensed channel, for the user equipment to notify the base station to communicate based on the target unlicensed channel.

Optionally, the channel list includes a plurality of target unlicensed channels, detecting whether the current used channel is the same as the target unlicensed channel includes:

Detecting whether the current used channel is the same as any of the plurality of target unlicensed channels, and determining that the current used channel is the same as the target unlicensed channel when the current used channel is the same as any of the plurality of target unlicensed channels.

Accordingly, the embodiment of the present disclosure further discloses a user equipment, which includes:

A receiving module, which is configured to receive a channel negotiation request issued by a base station, the channel negotiation request including a channel list that records information of a target unlicensed channel, the target unlicensed channel being a channel that needs to be used by the base station and in an unlicensed frequency band;

A processing module, which is configured to respond to the channel negotiation request, and send the channel list to an access point (AP) within a preset range, to instruct the AP to work through a channel except the target unlicensed channel included in the channel list;

A sending module, which is configured to notify the base station to communicate based on the target unlicensed channel, when a response message returned by the AP for the channel list is received.

Optionally, the processing module is specifically configured to:

Sequentially send a detection request frame carrying the channel list on a channel that is available used by a wireless local area network (WLAN), for notifying the AP within the preset range of the channel list through the detection request frame.

Optionally, there are a plurality of APs within the preset range, the sending module is specifically configured to:

Detect whether a response message returned by each of the plurality of APs within the preset range is received within a preset time window after sending the channel list;

Send a channel negotiation response to the base station when the response message returned by each of the plurality of APs is received, for notifying the base station to communicate based on the target unlicensed channel.

Optionally, the processing module is further configured to forbid scanning the target unlicensed channel after the sending module notifies the base station to communicate based on the target unlicensed channel.

Accordingly, the embodiment of the present disclosure discloses an AP device, which includes:

An information receiving module, which is configured to receive a channel list including information of a target unlicensed channel sent by a user equipment, the target unlicensed channel being a channel that needs to be used by the base station and in an unlicensed frequency band;

A detection module, which is configured to detect whether a current used channel is the same as the target unlicensed channel;

A switching module, which is configured to switch the current used channel to a channel that can be used by the WLAN except the target unlicensed channel, when a detection result acquired by the detection module indicates that the current used channel is the same as the target unlicensed channel;

An information sending module, which is configured to return a response message to the user equipment when the current used channel is different from the target unlicensed channel, for the user equipment to notify the base station to communicate based on the target unlicensed channel.

Optionally, the channel list includes a plurality of target unlicensed channels, the detection module is specifically configured to:

Detect whether the current used channel is the same as any of the plurality of target unlicensed channels, and determine that the current used channel is the same as the target unlicensed channel when the current used channel is the same as any of the plurality of target unlicensed channels.

Accordingly, the embodiment of the present disclosure further discloses a communication system based on an unlicensed frequency band, the communication system includes a base station, at least one user equipment and at least one AP device, in which, The base station is configured to generate a channel list that records information of a target unlicensed channel, and send a channel negotiation request carrying the channel list to the user equipment, the target unlicensed channel being a channel that needs to be used by the base station and in an unlicensed frequency band;

The user equipment is configured to receive the channel negotiation request sent by the base station, and respond to the channel negotiation request, and send the channel list to the at least one AP device;

The AP device is configured to receive the channel list sent by the user equipment, and detect whether a current used channel is the same as the target unlicensed channel; switch the current used channel to a channel that can be used by the WLAN except the target unlicensed channel, when the current used channel is the same as the target unlicensed channel; or return a response message to the user equipment when the current used channel is different from the target unlicensed channel;

The user equipment is further configured to notify the base station to communicate with the user equipment based on the target unlicensed channel, when the response message returned from the AP device for the channel list is received.

The embodiment of the present disclosure has following beneficial effects:

In the embodiment of the present disclosure, the user equipment can send information of a target unlicensed channel to an AP within a preset range when the user equipment receives a channel negotiation request, issued by a base station, including information of the target unlicensed channel that is needed to be used, so that the AP performs a channel conflict detection according to the information of the target unlicensed channel, namely detects whether a current used channel is the same as the target unlicensed channel. Thus, the current used channel can be switched to a channel which can be used by the WLAN except the target unlicensed channel when the current used channel is the same as the target unlicensed channel, so that the AP works through the channel except the target unlicensed channel and returns a response message to the user equipment, to indicate that the channel has no conflict. The user equipment can notify the base station to communicate based on the target unlicensed channel after receiving the response message. Thus, when a communication between the base station and the user equipment needs to be performed through the unlicensed channel, blindness in detection can be avoided, and efficiency of acquiring available channels in an unlicensed frequency band can be improved effectively.

BRIEF DESCRIPTION OF THE DRAWINGS

In order to describe the technical solutions in the embodiments of the present disclosure more clearly, the following briefly introduces the accompanying drawings needed for describing the embodiments, obviously, the accompanying drawings in the following description show some embodiments of the present disclosure, and persons of ordinary skill in the art may derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Obviously, the described embodiments are a part rather than all of the embodiments of the present disclosure. All other embodiments acquired by persons of ordinary skill in the art based on the embodiments of the present disclosure without creative efforts shall fall within the protection scope of the present disclosure.

It should be understood that the technical solution of the embodiments of the present disclosure can be applied in Long Term Evolution (LTE) system. Along with the continuous development of the communication technology, the method provided in the embodiments of the disclosure can be further used for future networks, such as a 5G network, which is not limited herein.

In the embodiment of the present disclosure, a user equipment (UE) is also referred to as a terminal, a mobile station (MS) or a mobile terminal, etc. The user equipment may be a mobile terminal such as a mobile phone (or called a "cell" phone) and a computer with a mobile terminal, for example. A base station can be an evolved base station in LTE, such as an Evolved Node B (eNB or eNodeB), or a base station in the future network, which is not limited in the embodiments of the present disclosure.

Figure 1:
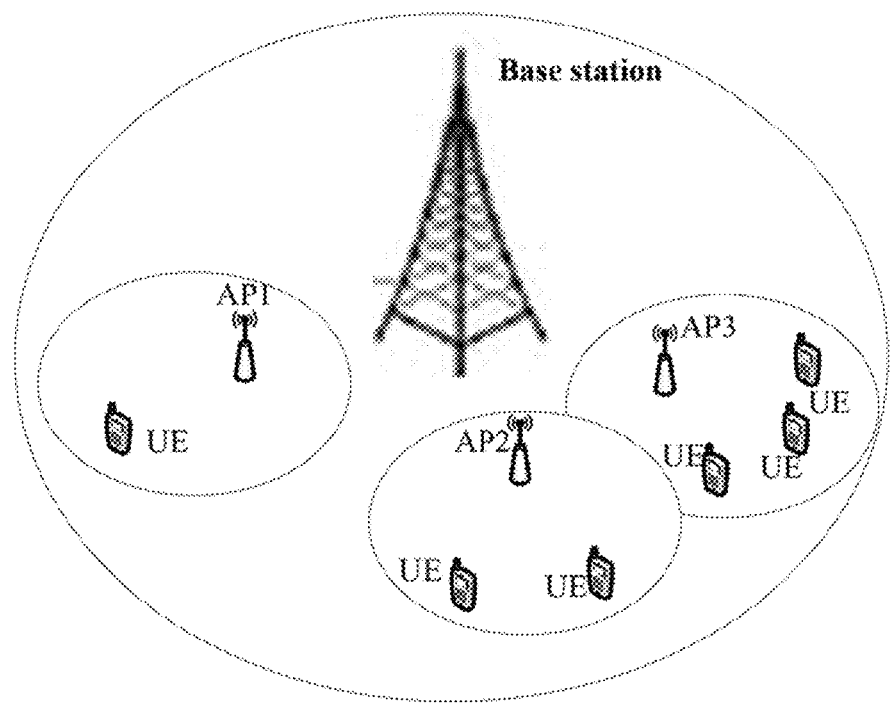
FIG. 1 is a schematic diagram of a network architecture provided in an embodiment of the present disclosure.

An application scene of an embodiment of the disclosure is introduced below. Please refer to FIG. 1, FIG. 1 is a schematic diagram of a network architecture provided in an embodiment of the present disclosure. Specifically, as shown in FIG. 1, a communication system includes a base station, a UE and an Access Point (AP). The base station and the UE can communicate through an LTE network, the UE and the AP can communicate through a wireless local area network (WLAN).

An embodiment of the disclosure discloses a communication method based on an unlicensed frequency band, a related equipment and a system, thus, efficiency of acquiring available channels in an unlicensed frequency band can be improved effectively. The present disclosure is described in detail below.

Figure 2:
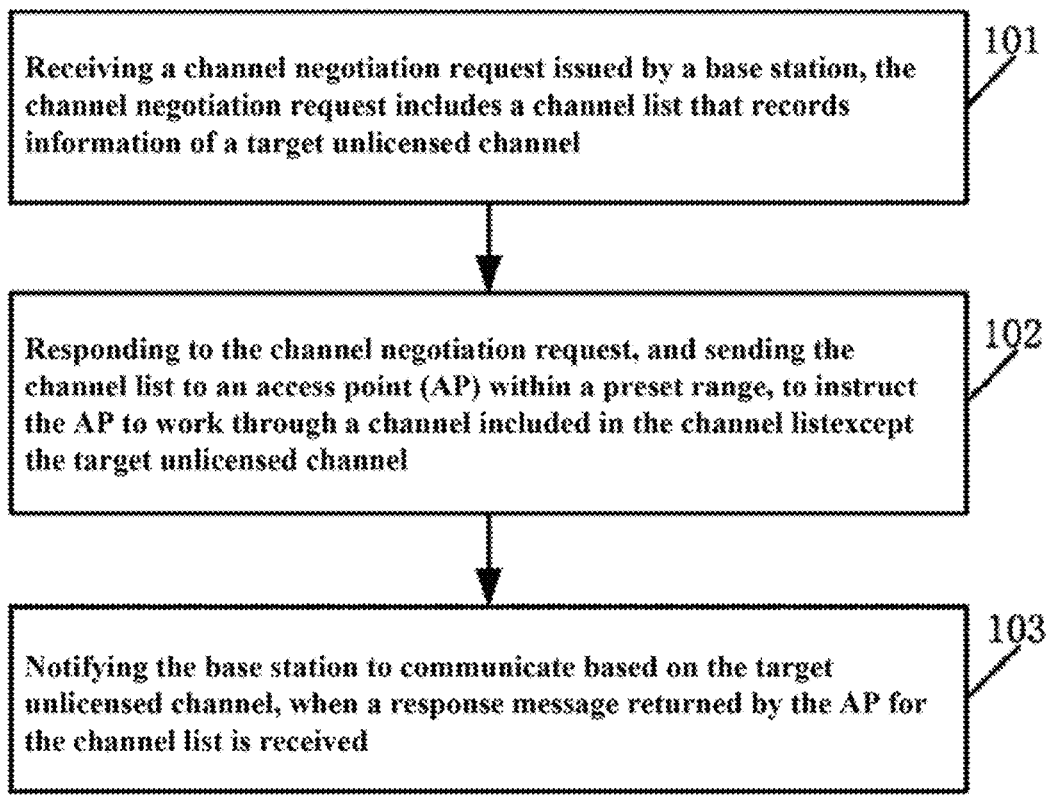
FIG. 2 is a flow diagram of a communication method based on an unlicensed frequency band provided in an embodiment of the present disclosure.

Referring to FIG. 2, FIG. 2 is a flow diagram of a communication method based on an unlicensed frequency band provided in an embodiment of the present disclosure. Specifically, the method provided in the embodiment of the disclosure can be applied to the user equipment, as shown in FIG. 2, the communication method based on the unlicensed frequency band can include the following steps:

101, receiving a channel negotiation request issued by a base station, the channel negotiation request includes a channel list that records information of a target unlicensed channel.

The target unlicensed channel is a channel that needs to be used by the base station and is in an unlicensed frequency band. It should be understood that the unlicensed frequency band may also be referred to as an unlicensed spectrum, a license-exempt frequency band, a license-exempt frequency spectrum, an unauthorized frequency band, an unauthorized spectrum, etc.

The channel negotiation request can be initiated by a base station, such as an eNodeB. Specifically, the eNodeB and the UE can communicate directly through an unlicensed frequency band. For example, when communication quality between the eNodeB and the UE is poor, the eNodeB can send a channel negotiation request to the UE, and negotiate to communicate through the unlicensed frequency band. In a negotiation process, the coexistence with the WLAN working in the unlicensed frequency band needs to be considered, so as to avoid a collision with a WLAN channel, namely, to avoid accessing a same channel and sending data. A channel that the eNodeB needs to use in an unlicensed frequency band, namely the target unlicensed channel, can be determined by a mobile network, which follows a frequency distribution principle of a cellular mobile communication network. The unlicensed frequency band is different from frequency bands allocated to adjacent base stations, so as to avoid a same-frequency interference. Moreover, an interaction process of channel negotiations between the eNodeB and the UE can be completed through the 4G or 5G mobile network.

102, responding to the channel negotiation request, and sending the channel list to an access point (AP) within a preset range, to instruct the AP to work through a channel except the target unlicensed channel included in the channel list.

When the UE receives the channel negotiation request sent by the eNodeB, the UE sends information of the target unlicensed channel included in the channel negotiation request to an AP within a preset range, namely an AP that can communicate with the UE. For example, the UE actively scans information of surrounding APs by using a WLAN module configured in the UE, so as to send the information of the target unlicensed channel that is needed to be used, to the surrounding APs, for instructing the AP(s) to work through a channel except the target unlicensed channel.

Specifically, sending the channel list to the AP within the preset range can be: sequentially sending a detection request frame carrying the channel list on a channel that is available used by the WLAN, for notifying the AP within the preset range of the channel list through the detection request frame. That is, when the UE receives the channel negotiation request from the base station, the UE scans the information of the surrounding APs by using the WLAN module. This process is mainly completed by actively scanning, that is, the detection request frame is sequentially sent on each channel that is available used by the WLAN, to detect the surrounding APs. At this time, the UE needs to send a detection request one by one on all channels of the WLAN, the detection request frame is carried with a channel list indicating one or more target unlicensed channels, which are needed to be used.

103, notifying the base station to communicate based on the target unlicensed channel, when a response message returned by the AP for the channel list is received.

In a particular embodiment, when the UE receives the response message returned by the AP for the channel list, the UE determines that a current working channel of the AP does not belong to target unlicensed channels in the channel list, and then the UE notifies the eNodeB that the eNodeB can use the target unlicensed channel to communicate.

Specifically, when there are a plurality of APs within the preset range, notifying the base station to communicate based on the target unlicensed channel includes: detecting whether a response message returned by each of the plurality of APs within the preset range is received within a preset time window after sending the channel list; and sending a channel negotiation response to the base station when the response message returned by each of the plurality of APs is received, for notifying the base station to communicate based on the target unlicensed channel. The preset time window can be preconfigured by a system. The channel negotiation response may include the channel list.

Moreover, optionally, after notifying the base station to communicate based on the target unlicensed channel, the UE can also be configured to forbid scanning of the target unlicensed channel. The scanning can be an active scanning or a passive scanning by using a WLAN module configured in the UE, so as to reduce power consumption of the UE.

Figure 3:
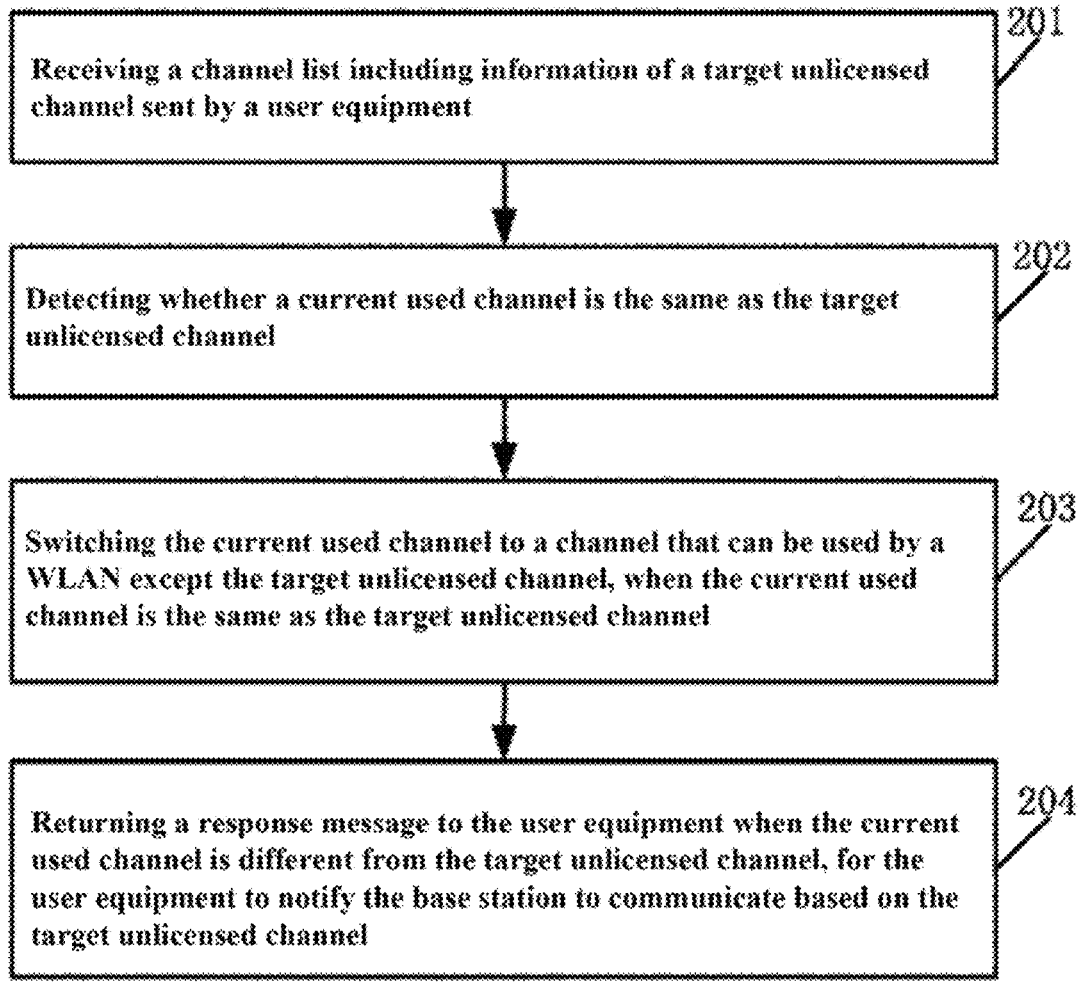
FIG. 3 is a flow diagram of another communication method based on an unlicensed frequency band provided in an embodiment of the present disclosure.

Referring to FIG. 3, FIG. 3 is a flow diagram of another communication method based on an unlicensed frequency band provided in an embodiment of the present disclosure. Specifically, the communication method provided in an embodiment of the present disclosure can be applied in the AP, as shown in FIG. 3, the communication method based on the unlicensed frequency band may include following steps:

201, receiving a channel list including information of a target unlicensed channel sent by a user equipment.

The target unlicensed channel is a channel that needs to be used by the base station and is in an unlicensed frequency band.

202, detecting whether a current used channel is the same as the target unlicensed channel.

The channel list is sent from the eNodeB to the UE when the UE and the base station (e.g., the eNodeB) need a target unlicensed frequency band to communicate. After receiving the channel list, the UE sends the channel list including the information of the target unlicensed frequency band to the AP within the preset range, namely the AP that can communicate with the UE. For example, the UE sequentially sends a detection request frame carrying the channel list to each channel that can be used by the WLAN, so as to send the channel list to surrounding APs through the detection request frame.

In a specific embodiment, after receiving the channel list sent by the UE, the AP detects a channel that is currently used, namely the current used channel, detects whether the current used channel is the same as the target unlicensed channel in the channel list, and determines that a channel conflict is existed when the current used channel is the same as the target unlicensed channel.

203, switching the current used channel to a channel that can be used by the WLAN except the target unlicensed channel, when the current used channel is the same as the target unlicensed channel.

204, returning a response message to the user equipment when the current used channel is different from the target unlicensed channel, for the user equipment to notify the base station to communicate based on the target unlicensed channel.

When detecting that the channel conflict is existed currently, the AP can perform a channel switch, to switch the current used channel to a WLAN channel included in the channel list except the target unlicensed channel. Then the AP uses the switched channel as a new current used channel to send a response message to the UE (e.g., the response message can be a detection request response or a beacon frame) to indicate that no channel conflict is existed, a current working channel of the AP is not the target unlicensed channel in the channel list, and the base station and the UE can communicate through the target unlicensed channel in the channel list. If no channel conflict is existed currently, that is, the current used channel is different from the target unlicensed channel, the AP returns the response message directly, to indicate that the current working channel of the AP is not the target unlicensed channel in the channel list, and the base station and the UE can communicate through the target unlicensed channel in the channel list.

Moreover, the channel list includes a plurality of target unlicensed channels, detecting whether the current used channel is the same as the target unlicensed channel includes: detecting whether the current used channel is the same as any of the plurality of target unlicensed channels, and determining that the current used channel is the same as the target unlicensed channel when the current used channel is the same as any of the plurality of target unlicensed channels.

The response message may include information of an AP channel switch, such as information of a channel used before switching and information of a channel used after switching. Thus, the AP and the UE can communicate through the channel used after the switching.

Figure 4:
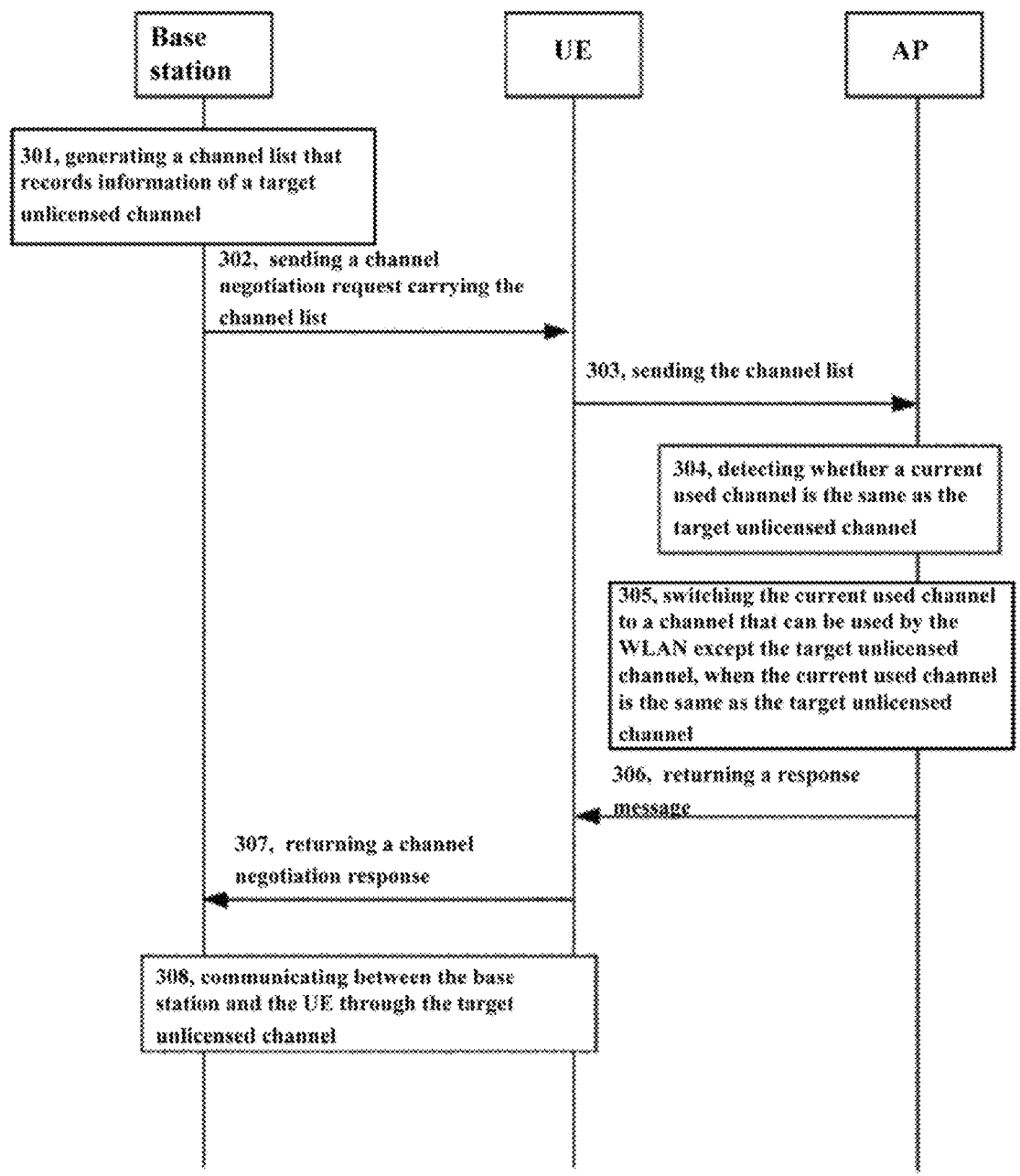
FIG. 4 is an interactive schematic diagram of a communication method based on an unlicensed frequency band provided in an embodiment of the present disclosure.

Referring to FIG. 4, FIG. 4 is an interactive schematic diagram of a communication method based on an unlicensed frequency band provided in an embodiment of the present disclosure. Specifically, as shown in FIG. 4, the communication method based on the unlicensed frequency band may include following steps:

301, generating a channel list that records information of a target unlicensed channel.

302, sending a channel negotiation request carrying the channel list.

Specifically, the base station and the user equipment can directly communicate through the unlicensed frequency band. For example, when communication quality between the base station and the user equipment is poor, the base station, such as an eNodeB, can generate a channel list including information of the unlicensed frequency band that needs to be used, namely a target unlicensed channel. Then the base station sends a channel negotiation request carrying the channel list to the user equipment (UE), to negotiate to communicate through the unlicensed frequency band. When the eNodeB is communicating with the UE through the unlicensed frequency band, a channel conflict with a WLAN channel working in the unlicensed frequency band needs to be avoided, that is, it is needed to avoid accessing a same channel and sending data.

303, sending the channel list.

When receiving the channel negotiation request carrying the channel list sent by the eNodeB, the UE sends the channel list to an AP within a preset range. Specifically, the WLAN module configured in the UE actively scans information of surrounding APs. That is, a detection request frame carrying the channel list is sequentially sent on each channel that is available used by the WLAN, so as to send the information of the target unlicensed channel that is needed to be used to the surrounding APs through the detection request frame, thereby instructing the AP(s) to work through a channel in the channel list except the target unlicensed channel.

304, detecting whether a current used channel is the same as the target unlicensed channel.

305, when the current used channel is the same as the target unlicensed channel, switching the current used channel to a channel that can be used by the WLAN except the target unlicensed channel.

306, return a response message.

In a specific embodiment, after receiving the channel list sent by the UE, the AP detects a channel that is currently used, namely the current used channel, and detects whether the current used channel is the same as the target unlicensed channel in the channel list. If the channel list includes a plurality of target unlicensed channels, the AP determines whether the current used channel is the same as any of the plurality of target unlicensed channels in the channel list). When the current used channel is the same as the target unlicensed channel, a channel conflict is determined to be existed.

When detecting that the channel conflict is existed currently, the AP can perform a channel switch according to the channel list, by switching the current used channel to a WLAN channel included in the channel list except the target unlicensed channel for working. Then the AP uses the switched channel as a new current used channel, and sends a response message to the UE through the switched channel, such as sending a detection request response or a beacon frame, for indicating that no channel conflict is existed and confirming that the AP is working through a channel included in the channel list except the target unlicensed channel. When detecting that no channel conflict is existed currently, that is, the current used channel is different from the target unlicensed channel, the response message is returned directly to indicate that the AP is working through the channel included in the channel list except the target unlicensed channel, and the base station and the UE can communicate through the target unlicensed channel in the channel list.

The response message may include information of an AP channel switch, such as information of a channel used before switching, information of a channel used after switching, and a Media Access Control (MAC) address of the AP, etc.

307, returning a channel negotiation response.

In a particular embodiment, when the UE receives the response message returned by the AP for the channel list, the UE determines that the current used channel of the AP is not the target unlicensed channel in the channel list. Then the UE further responds to the channel negotiation request, and sends the channel negotiation response to the eNodeB, for notifying the eNodeB to communicate with the UE through the target unlicensed channel. The channel negotiation response may include the channel list including the information of the target unlicensed channel.

Moreover, optionally, after returning the channel negotiation response, the UE can also be configured to forbid scanning of the target unlicensed channel. The scanning can be an active scanning or a passive scanning by using a WLAN module configured in the UE, so as to reduce power consumption of the UE.

308, communicating between the base station and the user equipment through the target unlicensed channel.

In the embodiment of the disclosure, when the user equipment receives a channel negotiation request issued by the base station, the channel negotiation request including information of a target unlicensed channel that is needed to be used, the user equipment sends the information of the target unlicensed channel to the AP within a preset range, to make the AP perform a channel conflict detection according to the information of the target unlicensed channel. That is, the AP detects whether a current used channel is the same as the target unlicensed channel, and switches the current used channel to a channel that can be used by the WLAN except the target unlicensed channel when the current used channel is the same as the target unlicensed channel. Thus, the AP works through the channel except the target unlicensed channel, and returns a response message to the user equipment so as to indicate that no channel conflict is existed. After receiving the response message, the user equipment notifies the base station to communicate based on the target unlicensed channel. Thus, when the base station and the user equipment need to communicate through an unlicensed channel, blind detection is not carried out any more, and efficiency of acquiring available channels in an unlicensed frequency band can be improved effectively.

Figure 5:
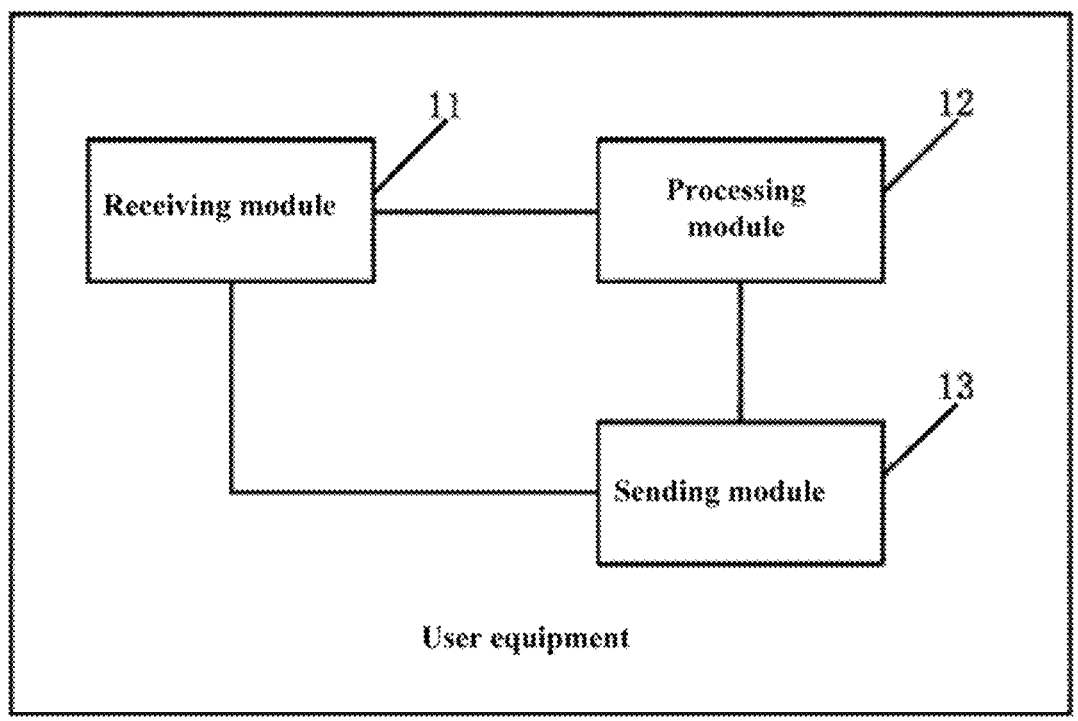
FIG. 5 is a schematic structural diagram of a user equipment provided in an embodiment of the present disclosure.

Referring to FIG. 5, FIG. 5 is a schematic structural diagram of a user equipment provided in an embodiment of the present disclosure. Specifically, as shown in FIG. 5, the user equipment in one embodiment of the present disclosure includes: a receiving module 11, a processing module 12 and a sending module 13, in which:

The receiving module 11 is configured to receive a channel negotiation request issued by a base station. The channel negotiation request includes a channel list that records information of a target unlicensed channel, and the target unlicensed channel is a channel that needs to be used by the base station and is in an unlicensed frequency band.

The channel negotiation request can be initiated by a base station, such as an eNodeB. Specifically, the eNodeB and the UE can communicate directly through an unlicensed frequency band. For example, when communication quality between the eNodeB and the UE is poor, the eNodeB can send a channel negotiation request to the UE, and negotiate to communicate through the unlicensed frequency band. In a negotiation process, the coexistence with the WLAN working in the unlicensed frequency band needs to be considered, so as to avoid a collision with a WLAN channel, namely, to avoid accessing a same channel and sending data. A channel that the eNodeB needs to use in an unlicensed frequency band, namely the target unlicensed channel, can be determined by a mobile network, which follows a frequency distribution principle of a cellular mobile communication network. The unlicensed frequency band is different from frequency bands allocated to adjacent base stations, so as to avoid a same-frequency interference. Moreover, an interaction process of channel negotiations between the eNodeB and the UE can be completed through the 4G or 5G mobile network.

The processing module 12 is configured to respond to the channel negotiation request, and send the channel list to an AP within a preset range, to instruct the AP to work through a channel except the target unlicensed channel included in the channel list.

In a specific embodiment, when the receiving module 11 receives the channel negotiation request sent by the eNodeB, the processing module 12 sends information of the target unlicensed channel included in the channel negotiation request to an AP within a preset range, namely an AP that can communicate with the UE. For example, the processing module 12 actively scans information of surrounding APs by using a WLAN module configured in the UE, so as to send the information of the target unlicensed channel that is needed to be used, to the surrounding APs, for instructing the AP(s) to work through a channel except the target unlicensed channel.

Specifically, in an embodiment of the present disclosure, the processing module 12 is specifically configured to:

Sequentially send a detection request frame carrying the channel list on a channel that is available used by a WLAN, for notifying the AP within the preset range of the channel list through the detection request frame.

The sending module 13 is configured to notify the base station to communicate based on the target unlicensed channel, when a response message returned by the AP for the channel list is received.

Optionally, in an embodiment of the preset disclosure, there are a plurality of APs within the preset range, the sending module 13 is specifically configured to:

Detect whether a response message returned by each of the plurality of APs within the preset range is received within a preset time window after sending the channel list;

Send a channel negotiation response to the base station when the response message returned by each of the plurality of APs is received, for notifying the base station to communicate based on the target unlicensed channel.

Moreover, optionally, in an embodiment of the present disclosure:

The processing module 12 is further configured to forbid scanning the target unlicensed channel after the sending module 13 notifies the base station to communicate based on the target unlicensed channel.

In a particular embodiment, when the UE receives the response message returned by the AP for the channel list, the UE determines that a current working channel of the AP does not belong to target unlicensed channels in the channel list, then the sending module 13 send the channel negotiation response to the eNodeB, to notify that the eNodeB can use the target unlicensed channel to communicate. The channel negotiation response may include the channel list.

Moreover, after the sending module 13 notifies the base station to communicate based on the target unlicensed channel, the processing module 12 can also be configured to forbid scanning of the target unlicensed channel. The scanning can be an active scanning or a passive scanning by using a WLAN module configured in the UE, so as to reduce power consumption of the UE.

Figure 6:
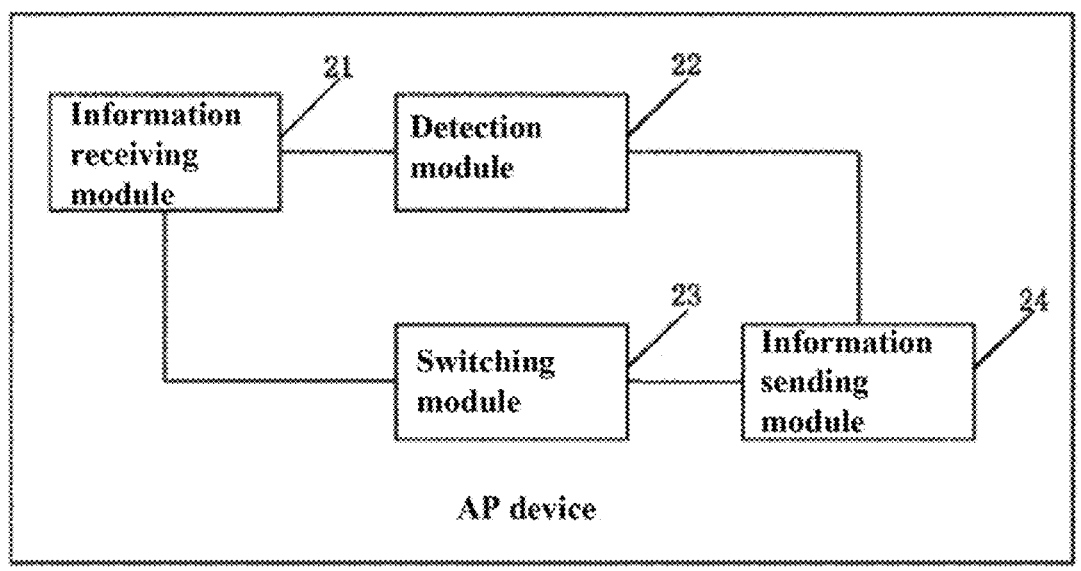
FIG. 6 is a schematic structural diagram of an access point device provided in an embodiment of the present disclosure.

Referring to FIG. 6, FIG. 6 is a schematic structural diagram of an access point device provided in an embodiment of the present disclosure. Specifically, as shown in FIG. 6, an AP device in an embodiment of the present disclosure includes: an information receiving module 21, a detection module 22, a switching module 23 and an information sending module 24, in which:

The information receiving module 21 is configured to receive a channel list including information of a target unlicensed channel sent by a user equipment. The target unlicensed channel is a channel that needs to be used by the base station and is in an unlicensed frequency band.

The detection module 22 is configured to detect whether a current used channel is the same as the target unlicensed channel.

The channel list is sent from the eNodeB to the UE when the UE and the base station (e.g., the eNodeB) need a target unlicensed frequency band to communicate. After receiving the channel list, the UE sends the channel list including the information of the target unlicensed frequency band to the AP within the preset range, namely the AP that can communicate with the UE. For example, by using an active scanning method, the UE sequentially sends a detection request frame carrying the channel list to each channel that can be used by the WLAN, so as to send the channel list to surrounding APs through the detection request frame.

Optionally, in an embodiment of the present disclosure, the channel list includes a plurality of target unlicensed channels, the detection module 22 is specifically configured to:

Detect whether the current used channel is the same as any of the plurality of target unlicensed channels, and determine that the current used channel is the same as the target unlicensed channel when the current used channel is the same as any of the plurality of target unlicensed channels.

In a specific embodiment, after the AP receives, through the information receiving module 21, the channel list sent by the UE, the detection module 22 detects a channel that is currently used, namely the current used channel, detects whether the current used channel is the same as the target unlicensed channel in the channel list, and determines that a channel conflict is existed when the current used channel is the same as the target unlicensed channel. If the channel list includes a plurality of target unlicensed channels, the detection module 22 determines whether the current used channel is the same as any of the plurality of target unlicensed channels.

The switching module 23 is configured to switch the current used channel to a channel that can be used by the WLAN except the target unlicensed channel, when a detection result acquired by the detection module 22 indicates that the current used channel matches the target unlicensed channel.

The information sending module 24 is configured to return a response message to the user equipment when the current used channel is different from the target unlicensed channel, for the user equipment to notify the base station to communicate based on the target unlicensed channel.

When the detection module 22 detects that a channel conflict is existed currently, the switching module 23 performs a channel switch by switching the current used channel to a WLAN channel except the target unlicensed channel included in the channel list, and uses the switched channel as a new current used channel. The information sending module 24 sends a response message to the UE (e.g., the response message can be a detection request response or a beacon frame) to indicate that no channel conflict is existed, a current working channel of the AP is not the target unlicensed channel in the channel list, and the base station and the UE can communicate through the target unlicensed channel in the channel list. If the detection module 22 detects that no channel conflict is existed currently, that is, the current used channel is different from the target unlicensed channel, the information sending module 24 returns the response message directly, to indicate that the current working channel of the AP is not the target unlicensed channel in the channel list, and the base station and the UE can communicate through the target unlicensed channel in the channel list.

Figure 7:
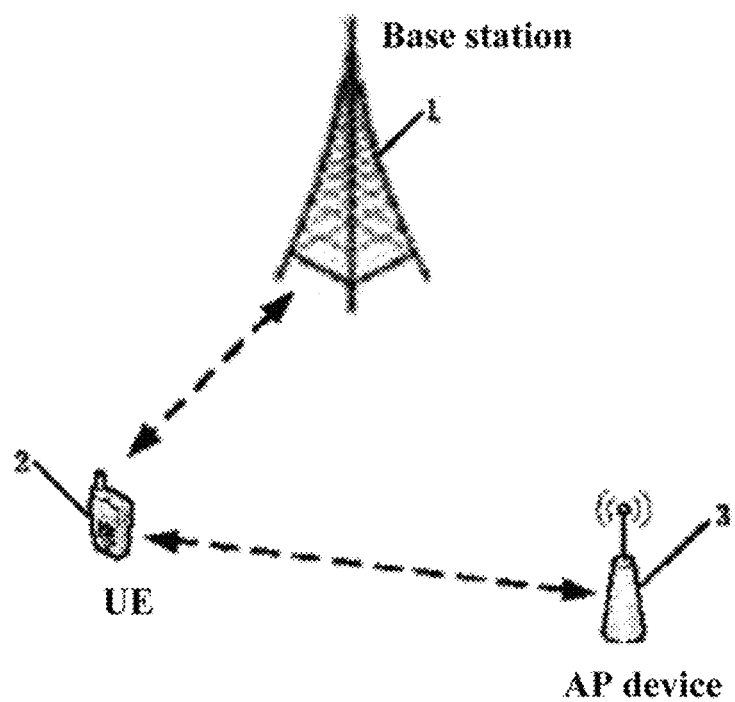
FIG. 7 is a schematic structural diagram of a communication system based on an unlicensed frequency band provided in an embodiment of the present disclosure.

Moreover, please refer to FIG. 7, which is a schematic structural diagram of a communication system based on an unlicensed frequency band provided in an embodiment of the present disclosure. Specifically, as shown in FIG. 7, the communication system includes a base station 1, at least one user equipment 2 and at least one AP device 3, in which:

The base station 1 is configured to generate a channel list that records information of a target unlicensed channel, and send a channel negotiation request carrying the channel list to the user equipment 2. The target unlicensed channel is a channel that needs to be used by the base station 1 and is in an unlicensed frequency band;

The user equipment 2 is configured to receive the channel negotiation request sent by the base station 1, and respond to the channel negotiation request, and send the channel list to the at least one AP device 3;

The AP device 3 is configured to receive the channel list sent by the user equipment 2, and detect whether a current used channel is the same as the target unlicensed channel; switch the current used channel to a channel that can be used by the WLAN except the target unlicensed channel, when the current used channel is the same as the target unlicensed channel; or return a response message to the user equipment 2 when the current used channel is different from the target unlicensed channel;

The user equipment 2 is further configured to notify the base station 1 to communicate with the user equipment 2 based on the target unlicensed channel, when the response message returned from the AP device 3 for the channel list is received.

Moreover, in an embodiment of the present disclosure,

The user equipment 2 is further configured to sequentially send a detection request frame carrying the channel list on a channel that is available used by a WLAN, for notifying the AP within the preset range of the channel list through the detection request frame.

Moreover, optionally, in an embodiment of the present disclosure, there are a plurality of APs within the preset range;

The user equipment 2 is further configured to detect whether a response message returned by each of the plurality of APs within the preset range is received within a preset time window after sending the channel list; send a channel negotiation response to the base station 1 when the response message returned by each of the plurality of APs is received, for notifying the base station 1 to communicate based on the target unlicensed channel.

Moreover, in an embodiment of the present disclosure,

The user equipment 2 is further configured to forbid scanning the target unlicensed channel after notifying the base station 1 to communicate based on the target unlicensed channel.

Moreover, in an embodiment of the present disclosure, the channel list includes a plurality of target unlicensed channels, The AP device 3 is further configured to detect whether the current used channel is the same as any of the plurality of target unlicensed channels, and determine that the current used channel is the same as the target unlicensed channel when the current used channel is the same as any of the plurality of target unlicensed channels.

In the embodiment of the present disclosure, a user equipment can send information of a target unlicensed channel to an AP within a preset range when the user equipment receives a channel negotiation request, issued by a base station, including information of the target unlicensed channel that is needed to be used, so that the AP performs a channel conflict detection according to the information of the target unlicensed channel, namely detects whether a current used channel is the same as the target unlicensed channel. Thus, the current used channel can be switched to a channel which can be used by the WLAN except the target unlicensed channel when the current used channel is the same as the target unlicensed channel, so that the AP works through the channel except the target unlicensed channel and returns a response message to the user equipment, to indicate that the channel has no conflict. The user equipment can notify the base station to communicate based on the target unlicensed channel after receiving the response message. Thus, when a communication between the base station and the user equipment needs to be performed through the unlicensed channel, blind detection is not carried out any more, and efficiency of acquiring available channels in an unlicensed frequency band can be improved effectively.

Figure 8:
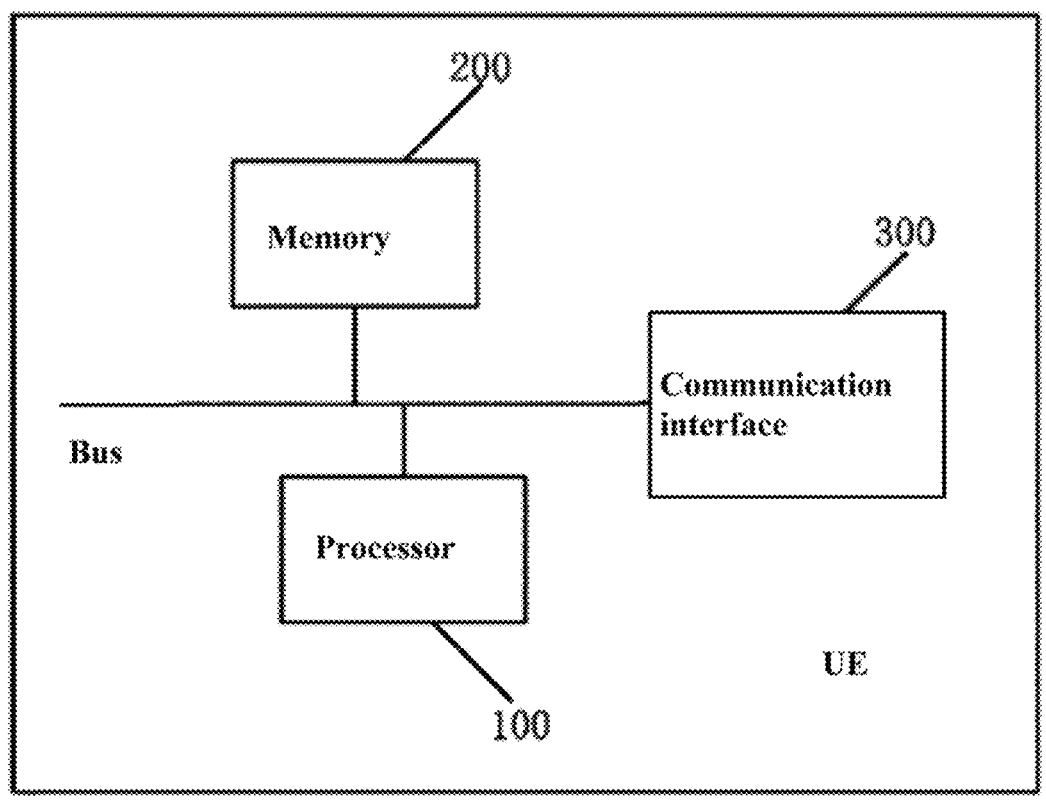
FIG. 8 is a schematic structural diagram of another user equipment provided in an embodiment of the present disclosure.

Moreover, Referring to FIG. 8, FIG. 8 is a schematic structural diagram of another user equipment provided in an embodiment of the present disclosure. Specifically, the user equipment in an embodiment of the present disclosure includes: a communication interface 300, a memory 200 and a processor 100, the processor 100 is connected to the communication interface 300 and the memory 200. The memory 200 may be a high-speed random access memory (RAM) memory or a non-volatile memory, such as at least one disk storage. The communication interface 300, the memory 200 and the processor 100 can be connected through a data connection using a bus, and also can be through another data connection using other modes. In an embodiment, for illustration, a bus connection is used herein. In which, The memory 200 is configured to store driving software;

The processor 100 reads the drive software from the memory 200 and executes under the action of the drive software, including:

Receiving a channel negotiation request issued by a base station through the communication interface 300, the channel negotiation request including a channel list that records information of a target unlicensed channel, the target unlicensed channel being a channel that needs to be used by the base station and in an unlicensed frequency band;

Responding to the channel negotiation request, and sending the channel list to an AP within a preset range, to instruct the AP to work through a channel except the target unlicensed channel included in the channel list;

Notifying the base station to communicate based on the target unlicensed channel through the communication interface 300, when a response message returned by the AP for the channel list is received.

Optionally, the processor 100 reads the drive software from the memory 200 and executes under the action of the drive software to send the channel list to the AP within the preset range, which includes steps of:

Sequentially sending a detection request frame carrying the channel list on a channel that is available used by a WLAN, for notifying the AP within the preset range of the channel list through the detection request frame.

Optionally, there are a plurality of APs within the preset range, the processor 100 reads the drive software from the memory 200 and executes under the action of the drive software to notify the base station to communicate based on the target unlicensed channel, which includes steps of:

Detecting whether a response message returned by each of the plurality of APs within the preset range is received within a preset time window after sending the channel list;

Sending a channel negotiation response to the base station through the communication interface 300 when the response message returned by each of the plurality of APs is received, for notifying the base station to communicate based on the target unlicensed channel.

Optionally, after notifying the base station to communicate based on the target unlicensed channel, the processor 100 reads the drive software from the memory 200 and executes under the action of the drive software to further:

forbid scanning the target unlicensed channel.

Figure 9:
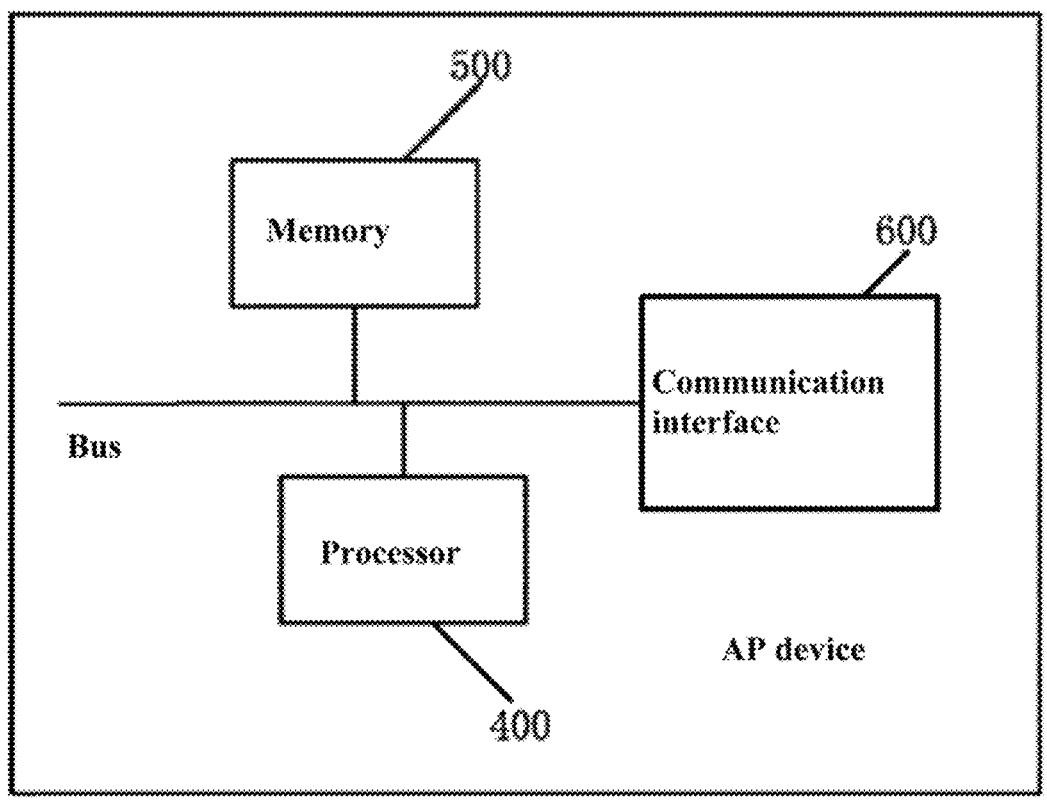
FIG. 9 is a schematic structural diagram of another access point device provided in an embodiment of the present disclosure.

Moreover, referring to FIG. 9, which is a schematic structural diagram of another access point device provided in an embodiment of the present disclosure. Specifically, the AP device in an embodiment of the present disclosure includes: a communication interface 600, a memory 500 and a processor 400, the processor 400 is connected to the communication interface 600 and the memory 500. The memory 500 may be a high-speed RAM memory or a non-volatile memory, such as at least one disk storage. The communication interface 600, the memory 500 and the processor 400 can be connected through a data connection using a bus, and also can be through another data connection using other modes. In an embodiment, for illustration, a bus connection is used herein. In which, The memory 500 is configured to store driving software;

The processor 400 reads the drive software from the memory 500 and executes under the action of the drive software, including:

Receiving a channel list including information of a target unlicensed channel sent by a user equipment through the communication interface 600, the target unlicensed channel being a channel that needs to be used by the base station and in an unlicensed frequency band;

Detecting whether a current used channel is the same as the target unlicensed channel;

Switching the current used channel to a channel that can be used by the WLAN except the target unlicensed channel, when the current used channel is the same as the target unlicensed channel;

Returning a response message to the user equipment through the communication interface 600 when the current used channel is different from the target unlicensed channel, for the user equipment to notify the base station to communicate based on the target unlicensed channel.

Optionally, the channel list includes a plurality of target unlicensed channels, the processor 400 reads the drive software from the memory 500 and executes under the action of the drive software to detect whether a current used channel is the same as the target unlicensed channel, which includes steps of:

Detecting whether the current used channel is the same as any of the plurality of target unlicensed channels, and determining that the current used channel is the same as the target unlicensed channel when the current used channel is the same as any of the plurality of target unlicensed channels.

In the above embodiments, the descriptions of each embodiment have different emphasis. If some descriptions in an embodiment are not described in detail, these descriptions can be referred to the relevant descriptions in other embodiments.

In several embodiments provided by the present disclosure, it should be understood that, the devices and the methods disclosed by the present disclosure can be realized in other manners. The devices in the embodiments described above are merely illustrative, for example, the division of the modules are merely divided according to logic function, and in actual implementation, another division mode can be used, for example, multiple modules or components can be combined or can be integrated into another system, or some features or functions can be ignored or not executed. For another aspect, the displayed or discussed mutual coupling or direct coupling or communication connection can be through some interfaces, an indirect coupling or communication connection of the devices or the modules can be electrical, mechanical or other forms.

The modules illustrated as separate parts may or may not be physically separated, the component displayed as a module may be or may not be a physical module, or may be distributed to a same location or distributed to a plurality of network units. According to actual requirements, some or all of the modules can be selected to achieve the purpose of the scheme of the embodiment.

In addition, the functional modules in various embodiments of the present disclosure can be integrated in a processing module or can be a signal physical module, and the two or more modules can be integrated in one module. The integrated module can be implemented in the form of hardware and also can be implemented in the form of a hardware with software function modules.

The integrated module implemented in the form of a software functional module can be stored in a computer readable storage medium. The software functional module is stored in a storage medium, and includes a plurality of instructions for enabling a computer device (e.g., a personal computer, a server, a network device etc.) or a processor to execute some steps of the method disclosed in the embodiments of the present disclosure. The storage medium includes a USB flash disk, a mobile hard disk, a read-only memory (ROM), a random access memory (RAM), a magnetic disk, an optical disk or other media capable of storing program codes.

Persons of skill in the art can clearly understand that, for describing conveniently and concisely, the division of each functional module is merely for illustration, in actual implementation, the above functions can be distributed to different function modules for executing according to requirements, that is, internal structure of the devices can be divided into different functional modules so as to complete all or part of the functions described above. The specific working process of the devices described above, can refer to the corresponding process in the method embodiments, and the description is not repeated herein.

Finally, it should be noted that the above embodiments are merely used to illustrate the technical solutions of the present disclosure and are not limited thereto; although the present disclosure has been described in detail with reference to the foregoing embodiments, it should be understood by those of ordinary skill in the art that, the technical scheme described in the embodiments can still be modified, or equivalently replacing some or all of the technical features; and the modification or replacement does not make the essence of the corresponding technical scheme depart from the scope of the technical solutions of the embodiments of the present disclosure.

What is claimed is:

1. A communication method based on unlicensed frequency bands, comprising:

receiving a channel negotiation request, which comprises a channel list that records information of a target unlicensed channel, the target unlicensed channel being a channel that needs to be used by the base station and in an unlicensed frequency band;

responding to the channel negotiation request, and sending the channel list to an access point (AP) within a preset range, to instruct the AP to work through a channel comprised in the channel list except the target unlicensed channel; and notifying the base station to communicate based on the target unlicensed channel, in response to a response message returned by the AP for the channel list, comprising:
- in response to a plurality of APs within the preset range, detecting whether a response message returned by each of the plurality of APs within the preset range is received within a preset time window after sending the channel list; and
- sending a channel negotiation response to the base station in response to the response message returned by each of the plurality of APs, for notifying the base station to communicate based on the target unlicensed channel.

2. The communication method of claim 1, wherein sending the channel list to the AP within the preset range comprising:
- sequentially sending a detection request frame carrying the channel list on a channel that is available used by a wireless local area network (WLAN), for notifying the AP within the preset range of the channel list through the detection request frame.

3. The communication method of claim 1, after notifying the base station to communicate based on the target unlicensed channel, further comprising:
- forbidding scanning the target unlicensed channel.

4. The communication method of claim 1, wherein the AP:
- receives the channel list sent by the user equipment;
- detects whether a current used channel is the same as the target unlicensed channel; and
- switches the current used channel to a channel that can be used by a WLAN except the target unlicensed channel, when the current used channel is the same as the target unlicensed channel; or
- returns the response message to the user equipment when the current used channel is different from the target unlicensed channel.

5. The communication method of claim 4, wherein the channel list comprises a plurality of target unlicensed channels, and the AP detects whether the current used channel is the same as the target unlicensed channel by:
- detecting whether the current used channel is the same as any of the plurality of target unlicensed channels, and determining that the current used channel is the same as the target unlicensed channel when the current used channel is the same as any of the plurality of target unlicensed channels.

6. User equipment, comprising:
- a processor; and
- a memory storing a drive software, which when executed by the processor, causes the processor to:
- receive a channel negotiation request issued by a base station, the channel negotiation request comprising a channel list that records information of a target unlicensed channel, the target unlicensed channel being a channel that needs to be used by the base station and in an unlicensed frequency band;
- respond to the channel negotiation request, and send the channel list to an access point (AP) within a preset range, to instruct the AP to work through a channel comprised in the channel list except the target unlicensed channel;
- notify the base station to communicate based on the target unlicensed channel, in response to a response message returned by the AP for the channel list, comprising:
  - in response to a plurality of APs within the preset range, detect whether a response message returned by each of the plurality of APs within the preset range is received within a preset time window after sending the channel list; and
  - send a channel negotiation response to the base station in response to the response message returned by each of the plurality of APs, for notifying the base station to communicate based on the target unlicensed channel.

7. The user equipment of claim 6, wherein the processor further:
- sequentially sends a detection request frame carrying the channel list on a channel that is available used by a wireless local area network (WLAN), for notifying the AP within the preset range of the channel list through the detection request frame.

8. The user equipment of claim 6, wherein the processor further:
- forbids scanning the target unlicensed channel after notifying the base station to communicate based on the target unlicensed channel.

9. The user equipment of claim 6, wherein the AP:
- receives the channel list sent by the user equipment;
- detects whether a current used channel is the same as the target unlicensed channel; and
- switches the current used channel to a channel that can be used by a WLAN except the target unlicensed channel, when the current used channel is the same as the target unlicensed channel; or
- returns the response message to the user equipment when the current used channel is different from the target unlicensed channel.

10. The user equipment of claim 9, wherein the channel list comprises a plurality of target unlicensed channels, and the AP detects whether the current used channel is the same as the target unlicensed channel by:
- detecting whether the current used channel is the same as any of the plurality of target unlicensed channels, and determining that the current used channel is the same as the target unlicensed channel when the current used channel is the same as any of the plurality of target unlicensed channels.

11. A non-transitory storage medium having stored thereon instructions that, when executed by a processor of user equipment, causes a processor of the user equipment to perform a communication method based on unlicensed frequency bands, the communication method comprising:
- receiving a channel negotiation request, which comprises a channel list that records information of a target unlicensed channel, the target unlicensed channel being a channel that needs to be used by the base station and in an unlicensed frequency band;
- responding to the channel negotiation request, and sending the channel list to an access point (AP) within a preset range, to instruct the AP to work through a channel comprised in the channel list except the target unlicensed channel;
- notifying the base station to communicate based on the target unlicensed channel, in response to a response message returned by the AP for the channel list, comprising:
  - in response to a plurality of APs within the preset range, detecting whether a response message returned by each of the plurality of APs within the preset range is received within a preset time window after sending the channel list; and sending a channel negotiation response to the base station in response to the response message returned by each of the plurality of APs, for notifying the base station to communicate based on the target unlicensed channel.

12. The non-transitory storage medium of claim 11, wherein sending the channel list to the AP within the preset range comprising:
   sequentially sending a detection request frame carrying the channel list on a channel that is available used by a wireless local area network (WLAN), for notifying the AP within the preset range of the channel list through the detection request frame.

13. The non-transitory storage medium of claim 11, wherein the communication method further comprises:
   forbidding scanning the target unlicensed channel after notifying the base station to communicate based on the target unlicensed channel.

14. The non-transitory storage medium of claim 11, wherein the AP:
   receives the channel list sent by the user equipment;
   detects whether a current used channel is the same as the target unlicensed channel; and
   switches the current used channel to a channel that can be used by a WLAN except the target unlicensed channel, when the current used channel is the same as the target unlicensed channel; or
   returns the response message to the user equipment when the current used channel is different from the target unlicensed channel.

15. The non-transitory storage medium of claim 14, wherein the channel list comprises a plurality of target unlicensed channels, and the AP detects whether the current used channel is the same as the target unlicensed channel by:
   detecting whether the current used channel is the same as any of the plurality of target unlicensed channels, and determining that the current used channel is the same as the target unlicensed channel when the current used channel is the same as any of the plurality of target unlicensed channels.

* * * * *